United States Patent
Horiuchi et al.

(10) Patent No.: US 9,553,698 B2
(45) Date of Patent: Jan. 24, 2017

(54) TERMINAL DEVICE AND RETRANSMISSION METHOD FOR DYNAMIC TDD UL/DL CONFIGURATION

(71) Applicant: Panasonic Intellectual Property Corporation of America, Torrance, CA (US)

(72) Inventors: Ayako Horiuchi, Kanagawa (JP); Toru Oizumi, Kanagawa (JP); Akihiko Nishio, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/443,005

(22) PCT Filed: Nov. 6, 2013

(86) PCT No.: PCT/JP2013/006554
§ 371 (c)(1),
(2) Date: May 14, 2015

(87) PCT Pub. No.: WO2014/080582
PCT Pub. Date: May 30, 2014

(65) Prior Publication Data
US 2015/0295683 A1 Oct. 15, 2015

(30) Foreign Application Priority Data

Nov. 26, 2012 (JP) .................................. 2012-257527

(51) Int. Cl.
*H04W 4/00* (2009.01)
*H04L 1/18* (2006.01)
(52) U.S. Cl.
CPC ............. *H04L 1/1896* (2013.01); *H04L 1/189* (2013.01); *H04L 1/1812* (2013.01); *H04L 1/1822* (2013.01); *H04L 1/1887* (2013.01)
(58) Field of Classification Search
CPC .... H04L 1/1896; H04L 1/1812; H04L 1/1822; H04W 72/042; H04W 72/0406
See application file for complete search history.

(56) References Cited

U.S. PATENT DOCUMENTS

2013/0343239 A1* 12/2013 Damnjanovic ......... H04L 5/001
370/280
2014/0086112 A1* 3/2014 Stern-Berkowitz H04W 72/1289
370/280

(Continued)

FOREIGN PATENT DOCUMENTS

WO 2012/162877 A1 12/2012

OTHER PUBLICATIONS

Extended European Search Report dated Oct. 23, 2015, for corresponding EP Application No. 13857098.1-1851/2925046, 8 pages.

(Continued)

*Primary Examiner* — Abdelnabi O Musa
(74) *Attorney, Agent, or Firm* — Seed IP Law Group LLP

(57) ABSTRACT

A terminal capable of ensuring that when a UL-DL configuration is switched over, recognition of a UL HARQ process continued in the UL-DL configuration before and after the switchover is matched between a base station and the terminal. A terminal (200) can be switched to either one of configuration patterns including a downlink subframe used in downlink communication and an uplink subframe used in uplink communication. Mapping between an uplink subframe and a retransmission process is set for each of the configuration patterns. On the basis of mapping in a unique base frame determined by a pre-switchover configuration pattern and a post-switchover configuration pattern, a determination unit (206) determines a first retransmission process to be continued after switchover from among retransmission (Continued)

processes in the pre-switchover configuration pattern, and a second retransmission process to be continued from the first retransmission process from among retransmission processes in the post-switchover configuration pattern.

10 Claims, 11 Drawing Sheets

(56) References Cited

U.S. PATENT DOCUMENTS

| | | | |
|---|---|---|---|
| 2014/0092824 A1* | 4/2014 | He | H04L 5/0055 370/329 |
| 2014/0122957 A1* | 5/2014 | Charbit | H04L 1/08 714/748 |
| 2014/0362796 A1* | 12/2014 | Seo | H04L 1/1854 370/329 |

OTHER PUBLICATIONS

3GPP TR 36.828 V11.0.0, "3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UP) interference management and traffic adaptation (Release 11)," Jun. 2012, 109 pages.

Catt, "Methods to support different UL/DL reconfiguration time scales for FS_LTE_TDD_eIMTA," R1-122062, 3GPP TSG RAN WG1 Meeting #69, Agenda Item: 710.3, Prague, Czech Republic, May 21-25, 2012, 3 pages.

International Search Report dated Dec. 24, 2013, for corresponding International Application No. PCT/JP2013/006554, 2 pages.

Renesas Mobile Europe Ltd., "Discussion on Enhancement for Dynamic TDD UL-DL Configuration," R1-122363, 3GPP TSG-RAN WG1 Meeting #69, Agenda Item: 7.10.4, Prague, Czech Republic, May 21-25, 2012, 4 pages.

* cited by examiner

| UL-DL CONFIG | NUMBER OF UL HARQ PROCESSES | CYCLE |
|---|---|---|
| 0 | 7 | 70ms (7 FRAMES) |
| 1 | 4 | 10ms (1 FRAME) |
| 2 | 2 | 10ms (1 FRAME) |
| 3 | 3 | 10ms (1 FRAME) |
| 4 | 2 | 10ms (1 FRAME) |
| 5 | 1 | 10ms (1 FRAME) |
| 6 | 6 | 60ms (6 FRAMES) |

FIG. 2

TERMINAL DEVICE AND RETRANSMISSION METHOD FOR DYNAMIC TDD UL/DL CONFIGURATION

TECHNICAL FIELD

The present invention relates to a terminal apparatus and a retransmission method.

BACKGROUND ART

In recent years, it has become common to transmit large-volume data such as still image data and moving image data in addition to audio data in cellular mobile communication systems, in response to the spread of multimedia information. In LTE-Advanced (Long Term Evolution Advanced), active studies have been conducted to achieve a high transmission rate using wideband radio band, MIMO (Multiple-Input Multiple-Output) transmission techniques and interference control techniques.

After completion of the acquisition of the parameter specific to the base station (which may also be referred to as "eNB"), the terminal (which may also be referred to as "UE: User Equipment") sends a connection request to the base station and thereby establishes communication with the base station. The base station transmits control information to the terminal with which communication has been established via a downlink control channel such as PDCCH (Physical Downlink Control Channel) as appropriate.

The terminal then performs "blind detection" of a plurality of pieces of control information (which may also be called "downlink control information (DCI)") included in the received PDCCH signal. That is, the control information includes a CRC (Cyclic Redundancy Check) portion and this CRC portion is masked with a terminal ID of the transmission target terminal by the base station. Therefore, the terminal cannot determine whether or not the received control information is control information intended for the terminal until the terminal demasks the CRC portion with the terminal ID of the terminal itself. When the demasking result shows that CRC calculation is OK, it is determined in this blind detection that the control information is intended for the terminal itself. The downlink control information includes DL (downlink) assignment indicating assignment information of downlink data and UL (uplink) grant indicating assignment information of uplink data, for example.

Next, an uplink retransmission control method in 3GPP LTE will be described. In LTE, there is an FDD (Frequency Division Duplex) system and a TDD (Time Division Duplex) system. In the FDD system, a downlink component carrier (downlink CC) and an uplink component carrier (uplink CC) are allocated to different frequency bands.

In the TDD system, a downlink component carrier and an uplink component carrier are in the same frequency band, and the TDD system realizes downlink communication and uplink communication by switching between downlink and uplink in a time-division manner. For this reason, in the TDD system, a downlink component carrier can also be expressed as "downlink communication timing in a component carrier." An uplink component carrier can also be expressed as "uplink communication timing in a component carrier." Switching between the downlink component carrier and the uplink component carrier is performed based on a UL-DL configuration as shown in FIG. 1

The UL-DL configuration is indicated to the terminal by a broadcast signal called "SIB1 (System Information Block Type 1)" (SIB1 indication), the value thereof is the same throughout the entire system and the value is not expected to be changed frequently. In the UL-DL configuration shown in FIG. 1, timings in units of subframes (that is, units of 1 msec) are configured for downlink communication (DL: Downlink) and uplink communication (UL: Uplink) per frame (10 msec). The UL-DL configuration allows for building a communication system that can flexibly respond to requests for throughput for downlink communication and throughput for uplink communication by changing a subframe ratio between downlink communication and uplink communication. For example, FIG. 1 illustrates UL-DL configurations (Config#0 to 6) with different subframe ratios between downlink communication and uplink communication. In FIG. 1, a downlink communication subframe (DL subframe) is represented by "D," an uplink communication subframe (UL subframe) is represented by "U" and a special subframe is represented by "S." Here, the special subframe is a subframe when a downlink communication subframe is switched to an uplink communication subframe. In the special subframe, downlink data communication may also be performed as in the case of a downlink communication subframe.

In LTE, a retransmission control method called "synchronous HARQ" is used in uplink to reduce the number of bits in a control signal. With synchronous HARQ, UL subframes whose UL HARQ processes are identical are determined in advance and when carrying out uplink retransmission, retransmission is carried out in UL subframes corresponding to the identical UL HARQ process. By so doing, a base station can select data to be retransmitted from a terminal without explicitly indicating, to the terminal, which of data transmitted in the past should be retransmitted. However, synchronous HARQ has a mechanism whereby uplink data transmitted in the past can be retransmitted only in a UL subframe of an identical process.

In LTE, the FDD system and TDD system assign different process numbers to UL HARQ processes, respectively. The TDD system predefines process numbers which differ depending on TDD UL-DL configurations (e.g., FIG. 1). In FIG. 1, a number assigned below a UL subframe ("U") indicates a process number of a UL HARQ process associated with the UL subframe. For example, in Config#0, the number of UL HARQ processes is 7 and UL HARQ processes of process numbers #1 to #7 (which may also be expressed as "UL HARQ processes #1 to #7" hereinafter) are assigned to UL subframes in order. In Config#2, the number of UL HARQ processes is 2 and UL HARQ processes #1 and #2 are assigned to UL subframes in order. The same applies to Config#1 and Config#3 to Config#6. In all UL HARQ processes, these numbers of UL HARQ processes are set to a minimum number of processes when an interval after uplink data is transmitted in a UL subframe until retransmission is indicated in a DL subframe is the fourth or after the fourth subframe, and at the same time an interval after retransmission is indicated in a DL subframe until retransmission data is transmitted in a UL subframe is the fourth or after the fourth subframe. Thus, a UL-DL configuration which includes many UL subframes has more UL HARQ processes and a UL-DL configuration which includes fewer UL subframes has fewer UL HARQ processes.

FIG. 2 illustrates the number of UL HARQ processes of each UL-DL configuration (Config#0 to Config#6) and a cycle (UL HARQ cycle, time [ms] or the number of frames) indicating an interval at which an association between a subframe number and a process number corresponding to the subframe number becomes identical.

In the LTE-Advanced system, studies are being carried out on changing UL-DL configuration (hereinafter referred to as "TDD eIMTA (enhancement for DL-UL Interference Management and Traffic Adaptation)," which may also be referred to as "dynamic TDD" or "flexible TDD") (e.g., see NPL 1). Exemplary purposes of TDD eIMTA include provision of a service that meets the needs of users by flexible changes of a UL/DL ratio or reduction in power consumption at a base station by increasing the UL ratio in a time zone when traffic load is low. As a method of changing UL-DL configuration, the following methods are under study in accordance with the purpose of change: (1) method using indication of an SI (System Information) signaling base, (2) method using indication of an RRC (higher layer) signaling base, (3) method using indication of a MAC (Media Access Control layer) signaling base and (4) method using indication of an L1 (Physical Layer) signaling base.

Method (1) is to change the least frequent UL-DL configuration. Method (1) is suitable for a case where the purpose is to reduce the power consumption at a base station by increasing the UL ratio, for example, in a time zone when traffic load is low (e.g., midnight or early morning). Method (4) is to change the most frequent UL-DL configuration. The number of terminals connected is smaller in a small cell such as a pico cell than in a large cell such as a macro cell. In a pico cell, UL/DL traffic in the entire pico cell is determined depending on the level of UL/DL traffic in a small number of terminals connected to the pico cell. For this reason, UL/DL traffic in the pico cell fluctuates drastically with time. Thus, method (4) is suitable for a case where UL-DL configuration is changed to follow a time fluctuation of UL/DL traffic in a small cell such as a pico cell. Method (2) and method (3) are positioned between method (1) and method (4) and suitable for a case where UL-DL configuration is changed with medium frequency.

CITATION LIST

Non Patent Literature

NPL 1
3GPP TR 36.828 V11.0.0, "Further enhancements to LTE Time Division Duplex (TDD) for Downlink-Uplink (DL-UL) interference management and traffic adaptation," June 2012

SUMMARY OF INVENTION

Technical Problem

As described above, the number of UL HARQ processes differs from one UL-DL configuration to another. In TDD eIMTA, when UL-DL configuration is dynamically reconfigured, the number of UL HARQ processes is also changed. When the number of UL HARQ processes is changed, it is necessary to determine which process of UL-DL configuration before reconfiguration (old UL-DL configuration) is continued to which process of UL-DL configuration after reconfiguration (new UL-DL configuration). Note that the "continuation of a process" indicates that in synchronous HARQ, uplink data (UL data) transmitted in a UL HARQ process of UL-DL configuration before reconfiguration is retransmitted in a UL HARQ process of UL-DL configuration after reconfiguration. For example, it is possible to consider a method of causing UL HARQ processes corresponding to an identical UL subframe (identical timing) to be continued in UL-DL configurations before and after reconfiguration.

According to this method, for example, as in the case of Config#1 and Config#2 shown in FIG. 1, when old UL-DL configuration and new UL-DL configuration have an identical cycle (UL HARQ Cycle) (cycle: 1 frame in FIG. 2), a UL HARQ process of which process number should be continued to a UL HARQ process of which process number is uniquely defined regardless of a frame in which UL-DL configurations are reconfigured (which may be referred to as "reconfiguration frame" hereinafter).

On the other hand, for example, as in the case of Config#0 and Config#2 shown in FIG. 1, when old UL-DL configuration and new UL-DL configuration do not have an identical cycle, a UL HARQ process of which process number should be continued to a UL HARQ process of which process number is not uniquely defined by a reconfiguration frame. FIGS. 3A and 3B illustrate cases where Config#0 is reconfigured to Config#2 as examples. As shown in FIG. 3A and FIG. 3B, subframe #2 and subframe #7 continue to be UL subframes common to both Config#0 and Config#2 (see FIG. 1). Note that as shown in FIG. 3A and FIG. 3B, a switching instruction (hereinafter, may be referred to as "reconfiguration instruction") of UL-DL configuration is indicated, for example, in leading subframe #0 of the frame.

As shown in FIG. 3A, when a terminal detects a reconfiguration instruction for UL-DL configuration in Frame#N+1, the terminal recognizes that UL HARQ process #7 corresponding to subframe #2 of Config#0 and UL HARQ process #3 corresponding to subframe #7 are continued. That is, UL HARQ process #7 corresponding to subframe #2 of Config#0 is continued as UL HARQ process #1 corresponding to subframe #2 of Config#2 and UL HARQ process #3 corresponding to subframe #7 of Config#0 is continued as HARQ process #2 corresponding to subframe #7 of Config#2.

On the other hand, as shown in FIG. 3B, when the terminal detects a reconfiguration instruction for UL-DL configuration in Frame#N+2, the terminal recognizes that UL HARQ process #6 corresponding to subframe #2 of Config#0 and UL HARQ process #2 corresponding to subframe #7 of Config#0 are continued. That is, UL HARQ process #6 corresponding to subframe #2 of Config#0 is continued as UL HARQ process #1 corresponding to subframe #2 of Config#2 and UL HARQ process #2 corresponding to subframe #7 of Config#0 is continued as HARQ process #2 corresponding to subframe #7 of Config#2.

Thus, UL HARQ processes to be continued differ depending on timing (frame) at which the terminal detects a reconfiguration instruction for UL-DL configuration. For example, let us consider a situation where the base station recognizes that the terminal reconfigures Config#0 to Config#2 in Frame#N+1 as shown in FIG. 3A, and the terminal cannot detect the reconfiguration instruction in Frame#N+1 as shown in FIG. 3B, but detects the reconfiguration instruction in Frame#N+2. In this situation, there will be a difference in recognition of UL HARQ processes to be continued before and after the reconfiguration of UL-DL configuration between the base station and the terminal.

In Config#0 and Config#6, the cycle shown in FIG. 2 (UL HARQ cycle) is longer than 1 frame. For this reason, especially when Config#0 or Config#6 is included as UL-DL configurations before and after reconfiguration, the UL HARQ processes to be continued differ depending on the reconfiguration frame of UL-DL configuration. There is a difference in recognition of UL HARQ processes to be continued in UL-DL configurations before and after the reconfiguration between the base station and the terminal in this way, which causes wrong data retransmission processing to be continued from the terminal to the base station.

An object of the present invention is to provide a terminal apparatus and a retransmission method capable of causing a base station and a terminal to have the same recognition of UL HARQ processes to be continued in UL-DL configurations before and after reconfiguration even when UL-DL configurations are reconfigured.

Solution to Problem

As described above, a terminal apparatus according to an aspect of the present invention is a terminal apparatus capable of reconfiguring a configuration pattern of subframes to one of a plurality of configuration patterns including a downlink subframe used for downlink communication and an uplink subframe used for uplink communication, the subframes forming one frame, the terminal apparatus including: a determining section that determines a first retransmission process to be continued after reconfiguration from among retransmission processes of a configuration pattern before the reconfiguration based on an association between the uplink subframe and a retransmission process in a base frame uniquely determined by the configuration patterns before and after the reconfiguration, and that determines a second retransmission process to which the first retransmission process is continued from among the retransmission processes of the configuration pattern after the reconfiguration, the association being set for each of the plurality of configuration patterns; and a selection section that selects data to be retransmitted from among transmission data stored for each retransmission process, based on the first retransmission process and the second retransmission process.

A retransmission method according to an aspect of the present invention is a retransmission method for a terminal apparatus capable of reconfiguring a configuration pattern of subframes to one of a plurality of configuration patterns including a downlink subframe used for downlink communication and an uplink subframe used for uplink communication, the subframes forming one frame, the retransmission method including: determining a first retransmission process to be continued after reconfiguration from among retransmission processes of a configuration pattern before the reconfiguration based on an association between the uplink subframe and a retransmission process in a base frame uniquely determined by the configuration patterns before and after the reconfiguration, and determining a second retransmission process to which the first retransmission process is continued from among the retransmission processes of the configuration pattern after the reconfiguration, the association being set for each of the plurality of configuration patterns; and selecting data to be retransmitted from among transmission data stored for each retransmission process, based on the first retransmission process and the second retransmission process.

Advantageous Effects of Invention

According to the present invention, it is possible to causing a base station and a terminal to have the same recognition of UL HARQ processes to be continued in UL-DL configurations before and after reconfiguration even when UL-DL configurations are reconfigured.

BRIEF DESCRIPTION OF DRAWINGS

FIG. 2 is a diagram illustrating the number of UL HARQ processes and cycle corresponding to UL-DL configuration;

DESCRIPTION OF EMBODIMENTS

Figure 1:
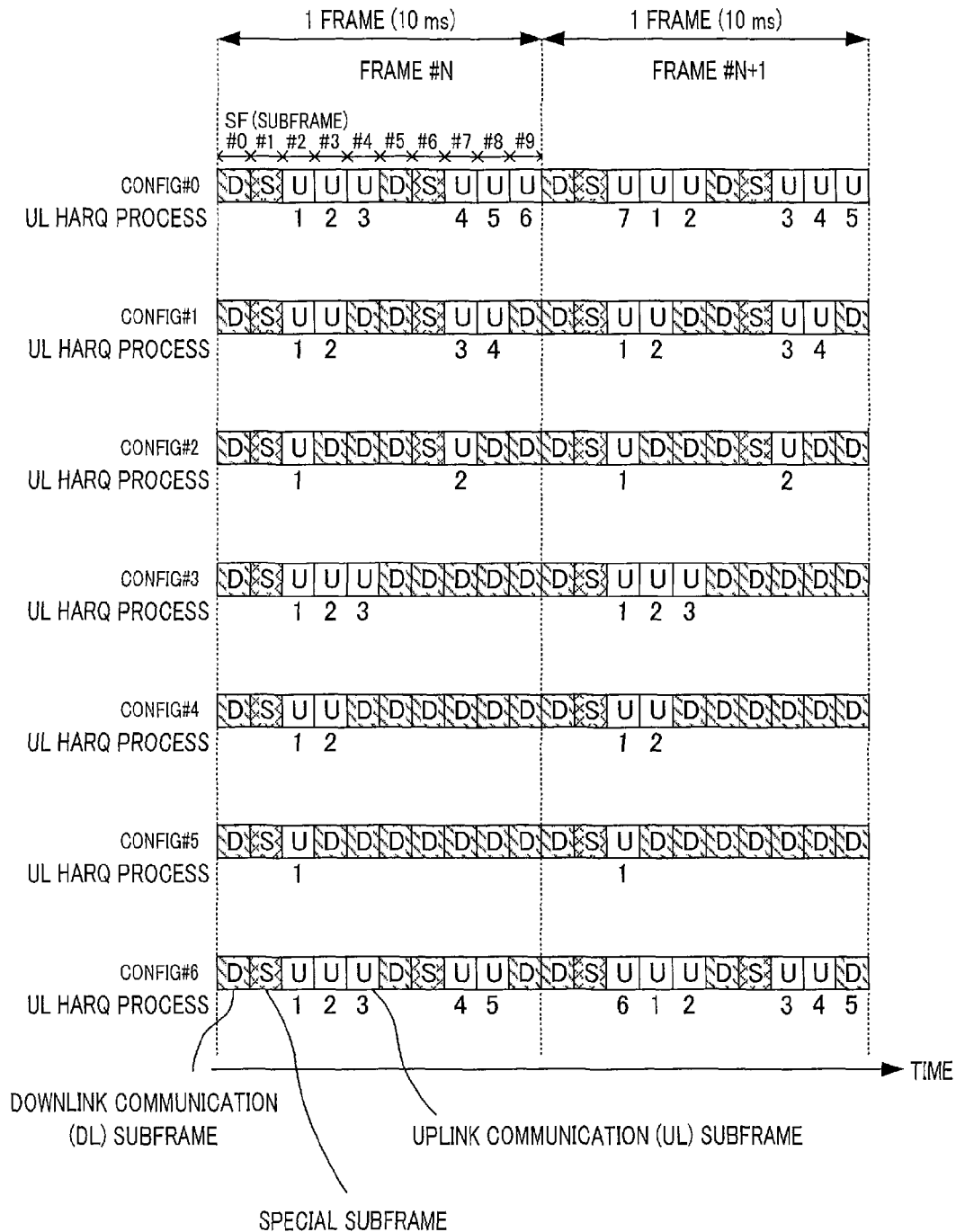
FIG. 1 is a diagram provided for describing UL-DL configuration and UL HARQ process in TDD.
Figure 3:
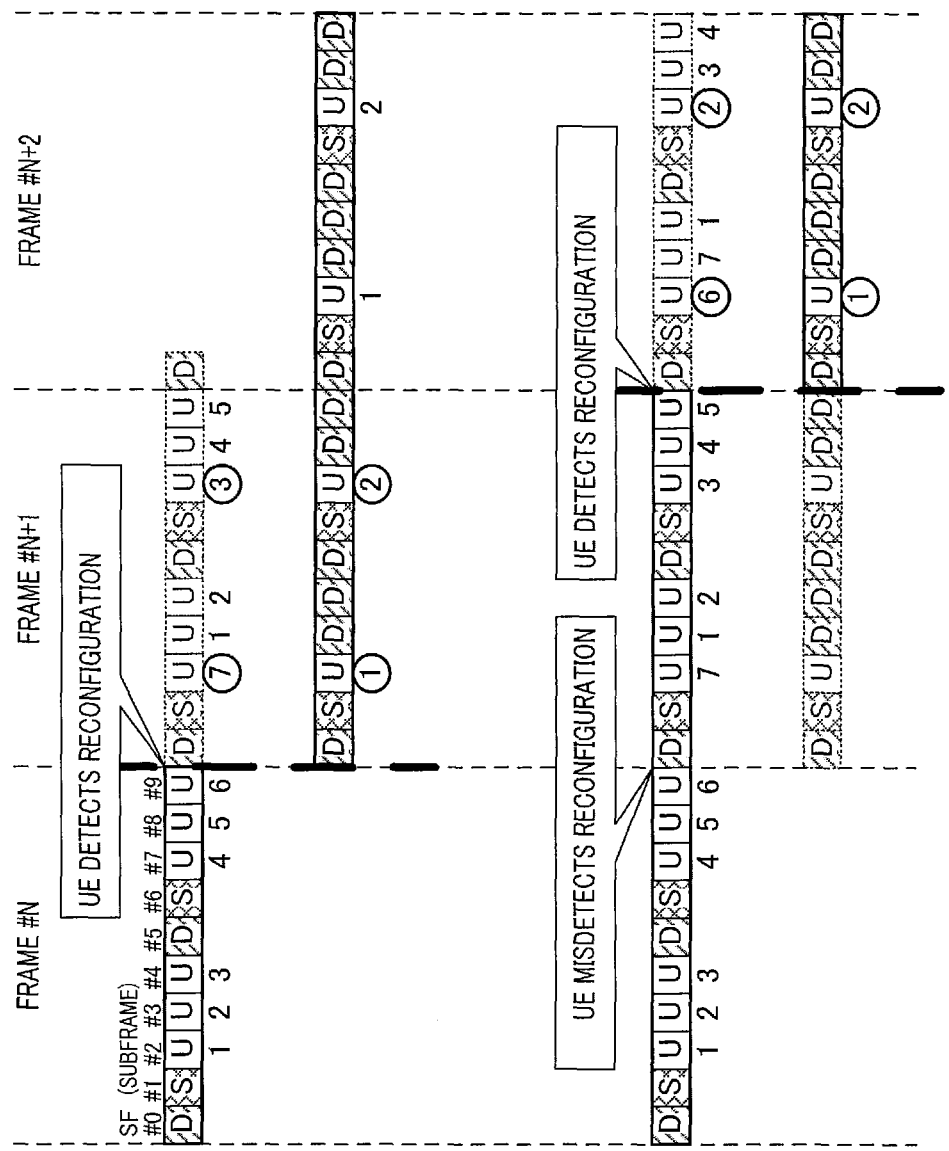
FIGS. 3A and 3B are diagrams provided for describing problems associated with a change of UL-DL configuration.

Hereinafter, embodiments of the present invention will be described in detail with reference to the accompanying drawings. Throughout the embodiments, the same elements are assigned the same reference numerals and any duplicate description of the elements is omitted.

(Embodiment 1)

Figure 4:
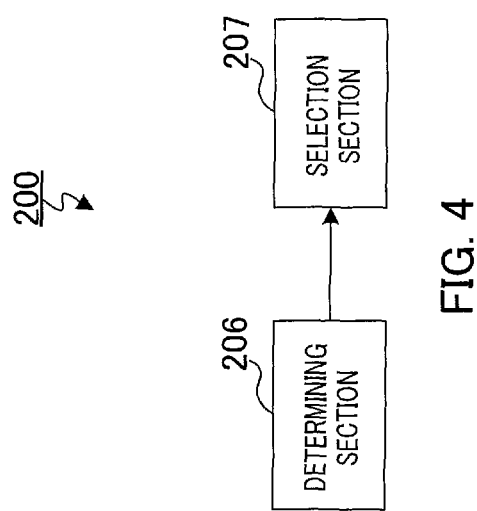
FIG. 4 is a block diagram illustrating a main configuration of a terminal according to an embodiment of the present invention.

FIG. 4 is a main configuration diagram of terminal 200 according to the present embodiment. Terminal 200 can perform reconfiguration to one of a plurality of configuration patterns (UL-DL configurations) of subframes making up 1 frame, each UL-DL configuration including a downlink subframe (DL subframe) used for downlink communication and an uplink subframe (UL subframe) used for uplink communication. An association between UL subframes and retransmission processes (UL HARQ processes) is configured for every plurality of UL-DL configurations (e.g., see FIG. 1). Determining section 206 in terminal 200 determines a first UL HARQ process (continuation source UL HARQ process) to be continued after reconfiguration of UL HARQ processes of the UL-DL configuration before reconfiguration based on the association in a base frame uniquely determined by a UL-DL configuration before reconfiguration and a UL-DL configuration after reconfiguration and determines a second UL HARQ process to which the above-described first UL HARQ process is continued (continuation destination UL HARQ process) of UL HARQ processes of the UL-DL configuration after reconfiguration. Selection section 207 selects data to be retransmitted from transmission data stored for each UL HARQ process based on the above-described first UL HARQ process and second UL HARQ process.

[Configuration of Base Station 100]

Figure 5:
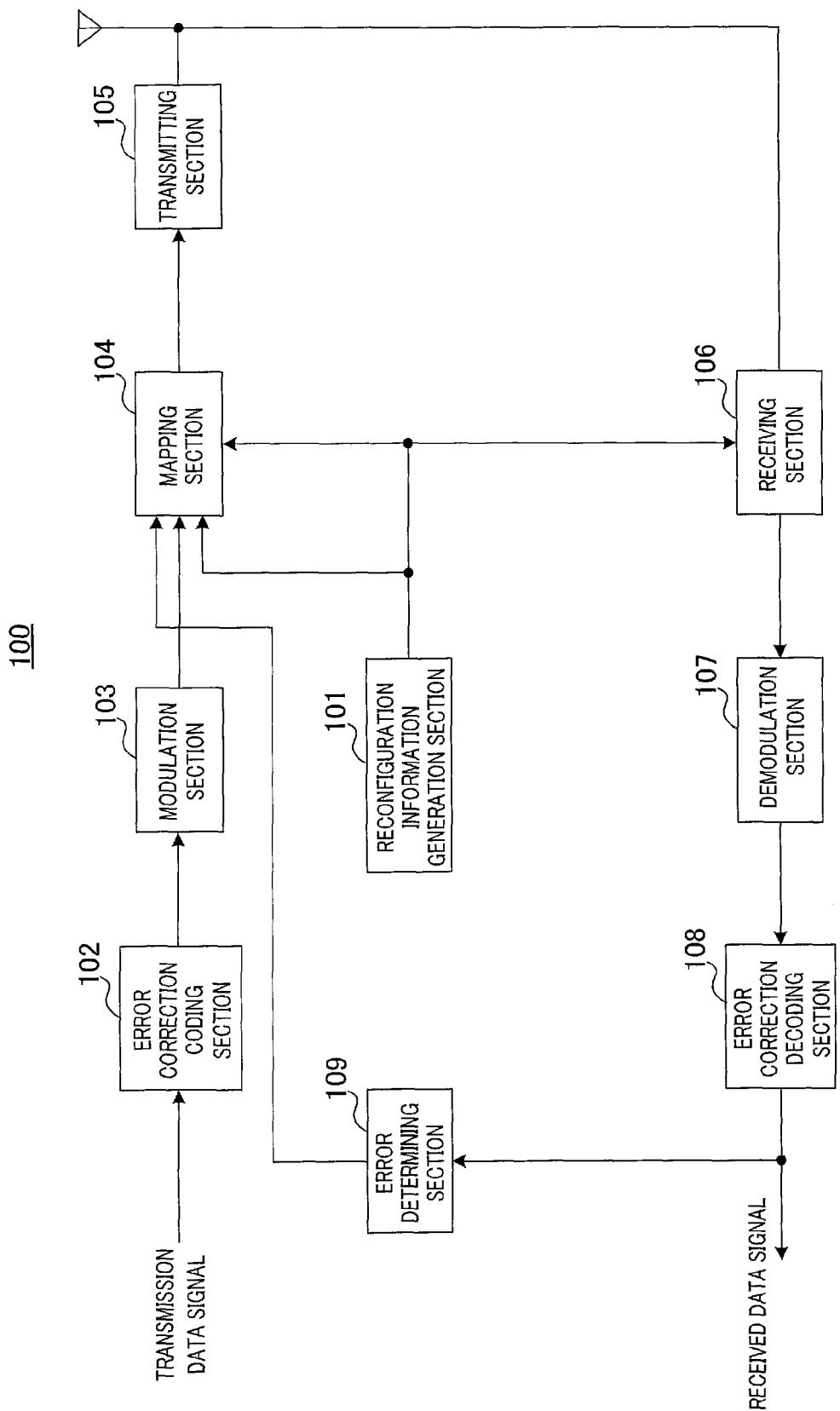
FIG. 5 is a block diagram illustrating a configuration of a base station according to an embodiment of the present invention.

FIG. 5 is a block diagram illustrating a configuration of base station 100 according to the embodiment of the present invention.

In FIG. 5, reconfiguration information generation section 101 determines whether or not to perform reconfiguration of UL-DL configuration on terminal 200 according to uplink and downlink traffic information or the like and generates, when performing reconfiguration, reconfiguration information including UL-DL configuration after reconfiguration as a reconfiguration instruction for UL-DL configuration for the terminal. Reconfiguration information generation section 101 outputs the generated reconfiguration information to mapping section 104 as a control signal to be indicated to terminal 200. The reconfiguration information is indicated through SI signaling, RRC signaling, MAC signaling or L1 signaling. Reconfiguration information generation section 101 outputs the UL-DL configuration after reconfiguration to mapping section 104 and receiving section106.

Error correction coding section 102 performs error correction coding on a transmission data signal (that is, downlink data) and outputs the coded signal to modulation section 103.

Modulation section 103 modulates the signal received from error correction coding section 102 and outputs the modulated signal to mapping section 104.

Mapping section 104 identifies a DL subframe according to the UL-DL configuration received from reconfiguration information generation section 101. In the identified DL subframe, mapping section 104 assigns the modulated signal received from modulation section 103, the reconfiguration information received from reconfiguration information generation section 101 and the retransmission request signal received from error determining section 109 which will be described later to a downlink resource. The retransmission request signal may be assigned to a resource region of PHICH (Physical Hybrid ARQ Indicator CHannel) or may be assigned to a resource region of an uplink control signal.

Thus, downlink data and a signal including control information (reconfiguration information or retransmission request signal or the like) are assigned to predetermined resources, and a transmission signal is thereby generated. The generated transmission signal is outputted to transmitting section 105.

Transmitting section 105 applies predetermined transmission processing such as up-conversion to the transmission signal received from mapping section 104 and transmits the transmission signal via an antenna.

Receiving section106 receives a signal transmitted from terminal 200 via the antenna. Radio receiving section106 identifies a UL subframe according to a UL-DL configuration received from reconfiguration information generation section 101, separates a signal of the identified UL subframe from the signal transmitted from terminal 200 and applies predetermined reception processing such as down-conversion. Receiving section106 outputs the signal after the reception processing to demodulation section 107.

Demodulation section 107 applies demodulation processing to the signal received from receiving section106 and outputs the demodulated signal obtained to error correction decoding section 108.

Error correction decoding section 108 decodes the demodulated signal received from demodulation section 107 and obtains a received data signal (that is, uplink data). The received data signal obtained is also outputted to error determining section 109.

Error determining section 109 determines whether or not the received data signal from error correction decoding section 108 includes any error. When the received data signal includes an error, error determining section 109 determines whether or not to request retransmission via uplink (UL retransmission). When requesting UL retransmission, error determining section 109 outputs a retransmission request signal corresponding to a UL subframe of a UL HARQ process identical to a UL HARQ process of the received data signal determined to include an error to mapping section 104.

[Configuration of Terminal 200]

Figure 6:
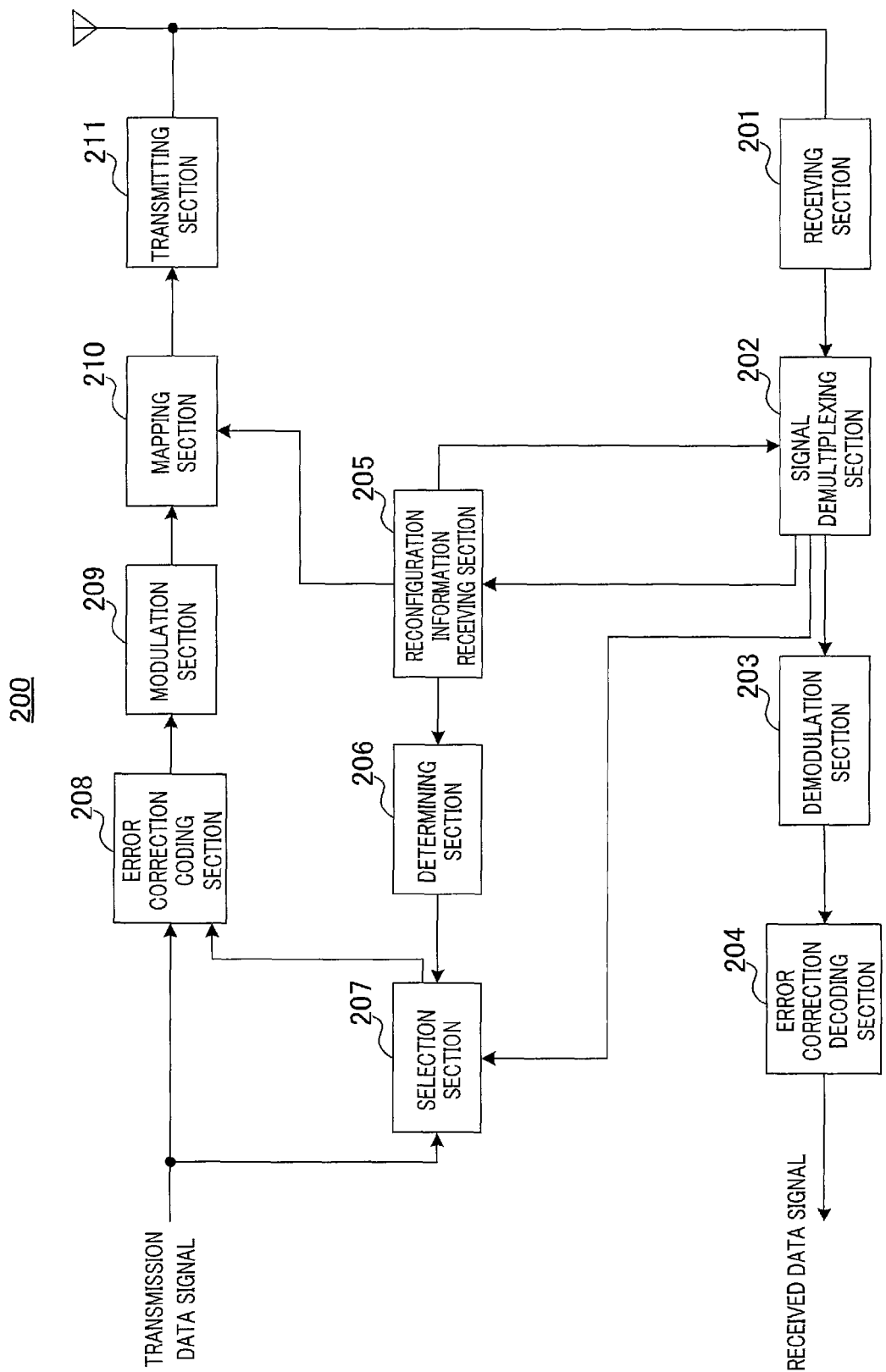
FIG. 6 is a block diagram illustrating a configuration of a terminal according to an embodiment of the present invention.

FIG. 6 is a block diagram illustrating a configuration of terminal 200 according to the present embodiment.

In FIG. 6, radio receiving section 201 receives a signal transmitted from base station 100 via antenna 201, applies predetermined reception processing such as down-conversion and outputs the signal subjected to the radio reception processing to signal demultiplexing section 202. Note that the received signal includes downlink data and control information (reconfiguration information or retransmission request signal or the like).

Signal demultiplexing section 202 extracts control information including reconfiguration information from a resource to which control information is assigned of the received signal received from receiving section 201 and outputs the extracted control information to reconfiguration information receiving section 205. Signal demultiplexing section 202 identifies a DL subframe according to the UL-DL configuration received from reconfiguration information receiving section 205, extracts a signal (that is, downlink data) corresponding to a downlink data resource in the identified DL subframe and outputs the extracted signal to demodulation section 203. Signal demultiplexing section 202 extracts a retransmission request signal from the received signal and outputs the extracted retransmission request signal to selection section 207. Note that the retransmission request signal (e.g., ACK/NACK or UL grant) is assigned to a PHICH resource region or uplink control signal resource region.

Demodulation section 203 demodulates the signal received from signal demultiplexing section 202 and outputs the demodulated signal to error correction decoding section 204.

Error correction decoding section 204 decodes the demodulated signal received from demodulation section 203 and outputs the received data signal obtained.

Reconfiguration information receiving section 205 extracts reconfiguration information intended for terminal 200 from the control information received from signal demultiplexing section 202. Thus, terminal 200 receives a reconfiguration instruction for the UL-DL configuration. Reconfiguration information receiving section 205 outputs the extracted reconfiguration information to determining section 206. Reconfiguration information receiving section 205 outputs the UL-DL configuration after reconfiguration indicated in the extracted reconfiguration information to signal demultiplexing section 202 and mapping section 210.

Determining section 206 determines a UL HARQ process to be continued in UL-DL configurations before and after reconfiguration based on the reconfiguration information received from reconfiguration information receiving section 205. More specifically, on the basis of the association between a UL subframe and a UL HARQ process in a base frame uniquely determined by UL-DL configuration before the reconfiguration and UL-DL configuration after the reconfiguration, determining section 206 determines the UL HARQ process (continuation source UL HARQ process) to be continued in a frame after the reconfiguration of the UL HARQ processes associated with the respective UL subframes included in the UL-DL configuration before the reconfiguration. Determining section 206 determines the UL HARQ process (continuation destination UL HARQ process) to which the HARQ process of the above-described continuation source is continued of the UL HARQ processes associated with the respective UL subframes included in the UL-DL configuration after the reconfiguration. Determining section 206 outputs the association between the determined continuation source UL HARQ process and the continuation destination UL HARQ process to selection section 207.

That is, determining section 206 determines a process number of a UL HARQ process to be continued according to the association between the UL HARQ process in the frame defined as the base frame and the UL subframe regardless of the frame in which terminal 200 received the reconfiguration information (frame in which reconfiguration was detected, reconfiguration frame). For example, determining section 206 causes the UL HARQ process in the UL-DL configuration before the reconfiguration at timing at which both the UL-DL configuration before the reconfiguration and the UL-DL configuration after the reconfiguration in the base frame are UL subframes to be continued as the UL HARQ process in the UL-DL configuration after the reconfiguration at the above-described timing.

For example, the base frame may also be a frame assigned a frame number which is divisible by a least common multiple between a frame cycle (UL HARQ Cycle, number of frames) in the UL HARQ process in the UL-DL configuration before the reconfiguration and a frame cycle in the UL HARQ process in the UL-DL configuration after the reconfiguration. Alternatively, the base frame may also be a frame assigned a frame number obtained by adding a predetermined number to a frame number which is divisible by a least common multiple between a frame cycle in the UL HARQ process in the UL-DL configuration before the reconfiguration and a frame cycle in the UL HARQ process in the UL-DL configuration after the reconfiguration.

Selection section 207 incorporates a buffer (UL HARQ buffer) that stores a transmission data signal (that is, uplink data) for each UL HARQ process. Upon receiving the association of UL HARQ processes to be continued from determining section 206, selection section 207 changes the association between the UL HARQ process and the transmission data signal according to the received association of UL HARQ processes (continuation source UL HARQ process and continuation destination UL HARQ process). Upon receiving a retransmission request signal from signal demultiplexing section 202, selection section 207 refers to the association of UL HARQ processes and determines a UL HARQ process corresponding to a UL subframe in which retransmission data is transmitted. That is, selection section 207 selects a transmission data signal (that is, retransmission data) corresponding to the determined UL HARQ process of the stored transmission data signal and outputs the transmission data signal to error correction coding section 208.

Error correction coding section 208 performs error correction coding on a transmission data signal (new data or retransmission data) and outputs the coded signal to modulation section 209.

Modulation section 209 modulates the signal outputted from error correction coding section 208 and outputs the modulated signal to mapping section 210.

Mapping section 210 identifies a UL subframe according to the UL-DL configuration received from reconfiguration information receiving section 205. Mapping section 210 assigns the signal received from modulation section 209 to an uplink resource in the identified UL subframe. The assigned signal is outputted to transmitting section 211 as a transmission signal.

Transmitting section 211 applies predetermined transmission processing such as up-conversion to the transmission signal received from mapping section 210 and transmits the transmission signal via the antenna.

[Operations of Base Station 100 and Terminal 200]

Operations of base station 100 and terminal 200 having the above-described configurations will be described in detail.

In the following description, indication of a reconfiguration instruction in an L1 signaling base will be described as an example.

Base station 100 indicates a reconfiguration instruction for UL-DL configuration of terminal 200 to terminal 200 over a plurality of frames. Base station 100 can instruct terminal 200 to perform reconfiguration of UL-DL configuration in any frame without being limited to the base frame.

Terminal 200 is a terminal switchable (reconfigurable) to one of a plurality of UL-DL configurations as shown in FIG. 1, for example.

The base frame is uniquely determined by the UL-DL configuration before reconfiguration and UL-DL configuration after reconfiguration. For example, the base frame is determined as a frame assigned a frame number which is divisible by a least common multiple between cycles (number of frames) of UL-DL configurations before and after the reconfiguration.

Terminal 200 reconfigures between UL-DL configurations in a frame in which a reconfiguration instruction for UL-DL configuration was received (reconfiguration frame). In that case, in the base frame, terminal 200 causes a UL HARQ process to be continued preferentially at timing at which both UL-DL configurations before and after the reconfiguration are UL subframes.

Terminal 200 does not perform the next retransmission for a UL HARQ process with no continuation destination of the UL-DL configuration before reconfiguration even in the middle of retransmission. Terminal 200 starts transmitting new data for a UL HARQ process with no continuation source of the UL-DL configuration after reconfiguration.

<When UL-DL Configurations have Identical Cycle (not Shown)>

First, a case will be described where UL-DL configurations before and after the reconfiguration have an identical cycle.

A case where Config#0 to Config#6 shown in FIG. 1 have an identical cycle is, for example, a case where reconfiguration is performed between Config#1 to Config#5 (cycle: 1 frame).

In reconfiguration among Configs#1, 2, 3, 4 and 5, a least common multiple between cycles (number of frames) of UL HARQ processes in UL-DL configurations before and after the reconfiguration is 1, and therefore all frames become base frames. In other words, in reconfiguration among Configs#1, 2, 3, 4 and 5, the association between UL HARQ processes at timing at which both UL-DL configurations before and after the reconfiguration are UL subframes is identical in all frames. Therefore, no matter in which frame reconfiguration between UL-DL configurations is performed, terminal 200 causes UL HARQ processes with an identical process number to be continued.

For example, between Config#1 and Config#2, subframes #2 and #7 are common UL subframes. Thus, terminal 200

(determining section 206) causes UL HARQ processes corresponding to subframes #2 and #7 to be continued when reconfiguring between UL-DL configurations. For example, when reconfiguring from Config#1 to Config#2, terminal 200 causes UL HARQ process #1 of Config#1 to be continued as UL HARQ process #1 of Config#2 and causes UL HARQ process #3 of Config#1 as UL HARQ process #2 of Config#2. Note that in subframes #3 and #8 which are UL subframes in Config#1 but DL subframes in Config#2, terminal 200 cannot cause UL HARQ processes #2 and #4 in Config#1 to be continued in Config#2. Thus, at the time of reconfiguration between UL-DL configurations, terminal 200 does not cause the two UL HARQ processes to be continued but cause them to terminate.

For example, between Config#1 and Config#3, subframes #2 and #3 are common UL subframes. Thus, at the time of reconfiguration between UL-DL configurations, terminal 200 causes UL HARQ processes corresponding to subframes #2 and #3 to be continued. For example, at the time of reconfiguration from Config#1 to Config#3, terminal 200 causes UL HARQ process #1 in Config#1 to be continued as UL HARQ process #1 in Config#3 and causes UL HARQ process #2 in Config#1 to be continued as UL HARQ process #2 in Config#3.

Note that in Config#3, subframe #4 is a UL subframe. Thus, in Config#3 after reconfiguration, another UL HARQ process in Config#1 can be continued in UL HARQ process #3 corresponding to subframe #4. Thus, terminal 200 may determine a UL HARQ process in a UL-DL configuration before reconfiguration at timing (second timing) different from timing (first timing) at which both UL-DL configurations before and after the reconfiguration are UL subframes as a continuation source UL HARQ process and determine a UL HARQ process in a UL-DL configuration after reconfiguration at timing (third timing) different from the first timing and the second timing as a continuation destination UL HARQ process. For example, terminal 200 may cause continuation of a UL HARQ process with a smallest process number (earliest timing) of UL HARQ processes corresponding to subframes which are not common UL subframes between the UL-DL configuration before reconfiguration and the UL-DL configuration after reconfiguration (UL HARQ processes #3 and #4 (subframes #7 and #8) in Config#1 shown in FIG. 1). In the case of reconfiguration from Config#1 to Config#3, the UL HARQ process with the smallest process number is UL HARQ process #3 in Config#1. Thus, terminal 200 may cause UL HARQ process #3 in Config#1 to be continued as HARQ process #3 in Config#3. In this way, the number of UL HARQ processes that can be continued at the time of reconfiguration between UL-DL configurations increases.

<When UL-DL Configurations have Different Cycles (FIG. 7)>

Next, a case will be described where UL-DL configurations before and after reconfiguration have different cycles.

Terminal 200 sets base frames at a frame interval which is divisible by a least common multiple between cycles (here the number of frames) of UL HARQ processes. Terminal 200 then determines a UL HARQ process to be continued between UL-DL configurations before and after the reconfiguration based on the association between a UL subframe and a UL HARQ process in a base frame.

In reconfiguration between Config#0 and Config#1, 2, 3, 4, 5, a least common multiple between cycles (number of frames) of UL HARQ processes is 7, and therefore the base frame is set to frame #7N (N is an optional integer including 0).

In reconfiguration between Config#6 and Config#1, 2, 3, 4, 5, a least common multiple between cycles (number of frames) of UL HARQ processes is 6, and therefore the base frame is set to frame #6N.

In reconfiguration between Config#0 and Config#6, a least common multiple between cycles (number of frames) of UL HARQ processes is 42, and therefore the base frame is set to frame #42N.

For example, a case of reconfiguration between Config#0 and Config#2 will be described as an example.

Since the cycle of UL HARQ processes in Config#0 is 7 frames and the cycle of UL HARQ processes in Config#2 is 1 frame, a least common multiple these frames is 7. Thus, as shown in FIG. 7A and FIG. 7B, the base frame is frame #7N.

At timing at which both UL-DL configurations before and after the reconfiguration in the base frame are UL subframes, terminal 200 (determining section 206) determines UL HARQ processes in UL-DL configuration before reconfiguration as continuation source UL HARQ processes and determines UL HARQ processes in UL-DL configuration after reconfiguration at the timing as continuation destination UL HARQ processes.

Figure 7A:
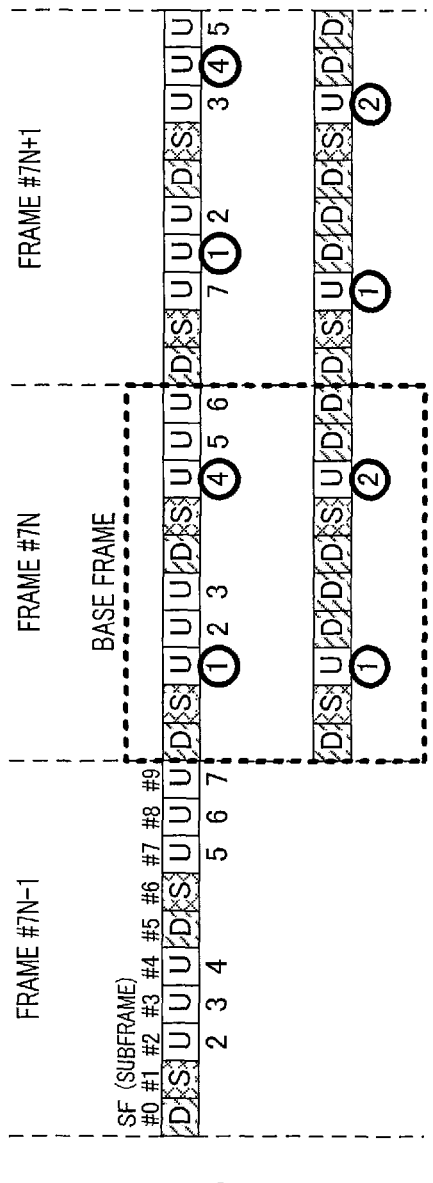
FIGS. 7A and 7B are diagrams illustrating a UL-DL configuration reconfiguration method according to Embodiment 1 of the present invention.
Figure 7B:
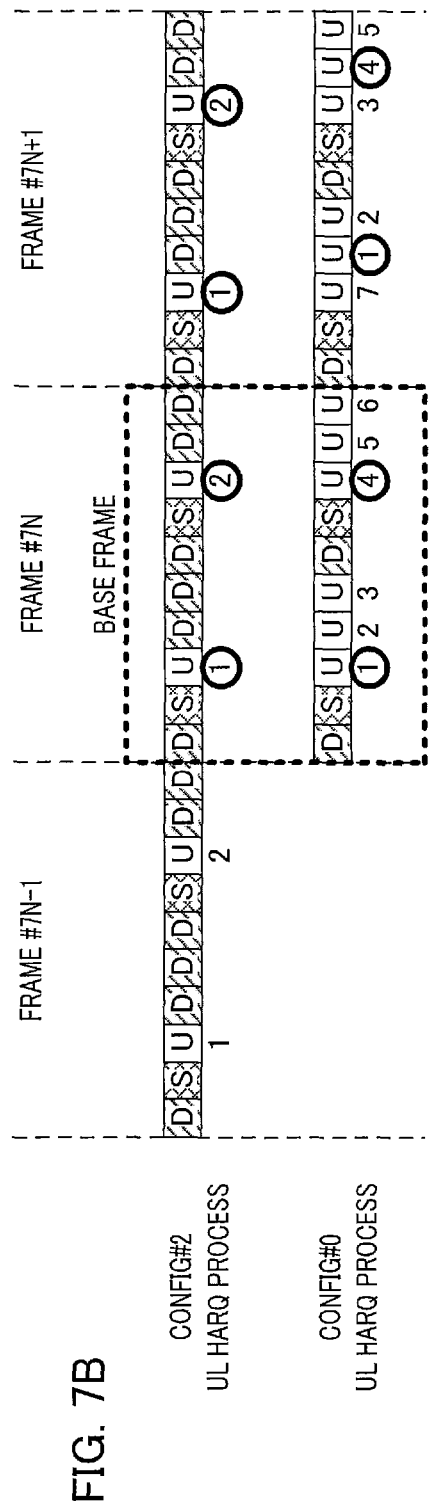

As shown in FIG. 7A and FIG. 7B, timings at which both Config#0 and Config#2 become UL subframes are subframes #2 and #7. In base frame #7N, subframe #2 in Config#0 corresponds to UL HARQ process #1 and subframe #7 corresponds to UL HARQ process #4. As shown in FIG. 7A and FIG. 7B, in base frame #7N, subframe #2 in Config#2 corresponds to UL HARQ process #1 and subframe #7 corresponds to UL HARQ process #2.

Thus, as shown in FIG. 7A, when reconfiguring from Config#0 to Config#2, terminal 200 (determining section 206) associates UL HARQ process #1 in Config#0 with UL HARQ process #1 in Config#2 and associates UL HARQ process #4 in Config#0 with UL HARQ process #2 in Config#2. When recognizing reconfiguration (detecting a reconfiguration) between UL-DL configurations in any frame without being limited to base frame #7N, terminal 200 causes the UL HARQ processes to be continued according to the association between the UL HARQ processes in the base frame.

For example, as shown in FIG. 7A, in a case where Config#0 is reconfigured to Config#2, even when terminal 200 recognizes reconfiguration (detecting a reconfiguration) between UL-DL configurations in any frame without being limited to base frame #7N, terminal 200 causes UL HARQ process #1 in Config#0 to be continued as UL HARQ process #1 in Config#2 and causes UL HARQ process #4 in Config#0 to be continued as UL HARQ process #2 in Config#2. Note that in FIG. 7A, terminal 200 does not perform the next retransmission for UL HARQ processes #2, #3, #5 and #6 in Config#0 before reconfiguration even in the middle of retransmission.

Similarly, as shown in FIG. 7B, in a case where Config#2 is reconfigured to Config#0, even when terminal 200 recognizes reconfiguration (detecting a reconfiguration) between UL-DL configurations in any frame (e.g., frame #7N+1) without being limited to base frame #7N, terminal 200 causes UL HARQ process #1 in Config#2 to be continued as UL HARQ process #1 in Config#0 and causes UL HARQ process #2 in Config#2 to be continued as UL HARQ process #4 in Config#0. Note that in FIG. 7B, terminal 200 starts transmitting new data for UL HARQ processes #2, #3, #5 and #6 in Config#0 after the reconfiguration.

As shown in FIG. 7A and FIG. 7B, upon detecting reconfiguration information in any frame, terminal 200 determines UL HARQ processes to be continued based on the association between UL subframes and UL HARQ processes in the base frame. In this way, even when the UL-DL configuration reconfiguration timing in terminal 200 recognized by base station 100 is different from the actual UL-DL configuration reconfiguration timing in terminal 200, base station 100 and terminal 200 have the same recognition of UL HARQ processes to be continued in UL-DL configurations before and after the reconfiguration.

Thus, in the present embodiment, even when UL-DL configurations are reconfigured, base station 100 and terminal 200 can have the same recognition of UL HARQ processes to be continued in UL-DL configurations before and after the reconfiguration, and it is thereby possible to avoid terminal 200 from retransmitting wrong data.

Note that a case has been described in the present embodiment where when it is possible to continue UL HARQ processes corresponding to UL subframes (UL subframes at different timings) which are not common between UL-DL configurations before and after the reconfiguration, the UL HARQ processes are continued as much as possible by causing them to associate with each other. However, terminal 200 may cause UL HARQ processes not to associate (not continue) with each other for UL subframes which are not common between UL-DL configurations before and after the reconfiguration. This reduces the possibility that UL HARQ processes in UL subframes for which a retransmission instruction is too late may be continued. Alternatively, terminal 200 may also cause UL HARQ processes corresponding to the UL subframes to associate (continue) with each other only when a retransmission instruction is in time for UL subframes which are not common between UL-DL configurations before and after the reconfiguration. Here, a "retransmission instruction being in time" indicates that a DL subframe that indicates retransmission using an ACK/NACK signal or UL grant is 4 or more subframes earlier than a UL subframe in the UL-DL configuration after the reconfiguration with respect to a UL HARQ process corresponding to a UL subframe in the UL-DL configuration before the reconfiguration.

A case has been described in FIG. 7 where a frame assigned a frame number which is divisible by a least common multiple between cycles (number of frames) of UL HARQ processes is set as a base frame. However, a frame assigned a frame number obtained by adding, for example, a predetermined number M to a frame number which is divisible by a least common multiple between cycles (number of frames) of UL HARQ processes may also be set as a base frame. Here, the above-described least common multiple corresponds to the number of patterns of frames which differ in the association between subframe numbers and process numbers of UL HARQ processes. The predetermined number M can take on, for example, a value 0 to (least common multiple −1). More specifically, since a least common multiple between cycles (number of frames) of UL HARQ processes for reconfiguration between Config#0 and Config#1, 2, 3, 4, 5 is 7, the number of patterns of frames which differ in the association between subframe numbers and process numbers of cycles of UL HARQ processes is 7. Therefore, the base frame may be one of frames #7N+M (M: one of 0 to 6).

A case has been described in the present embodiment where UL HARQ process numbers are assigned in ascending order relative to frame #0, but this will not limit the way of assigning numbers itself and UL HARQ process numbers can be freely assigned by each terminal. However, since there must be common recognition between a base station and a terminal regarding which UL HARQ process corresponds to which UL subframe, numbers are assigned for the sake of convenience.

(Embodiment 2)

While a base frame is set in advance in Embodiment 1, the present embodiment will describe a case where information relating to a base frame will be indicated from a base station to a terminal.

Figure 8:
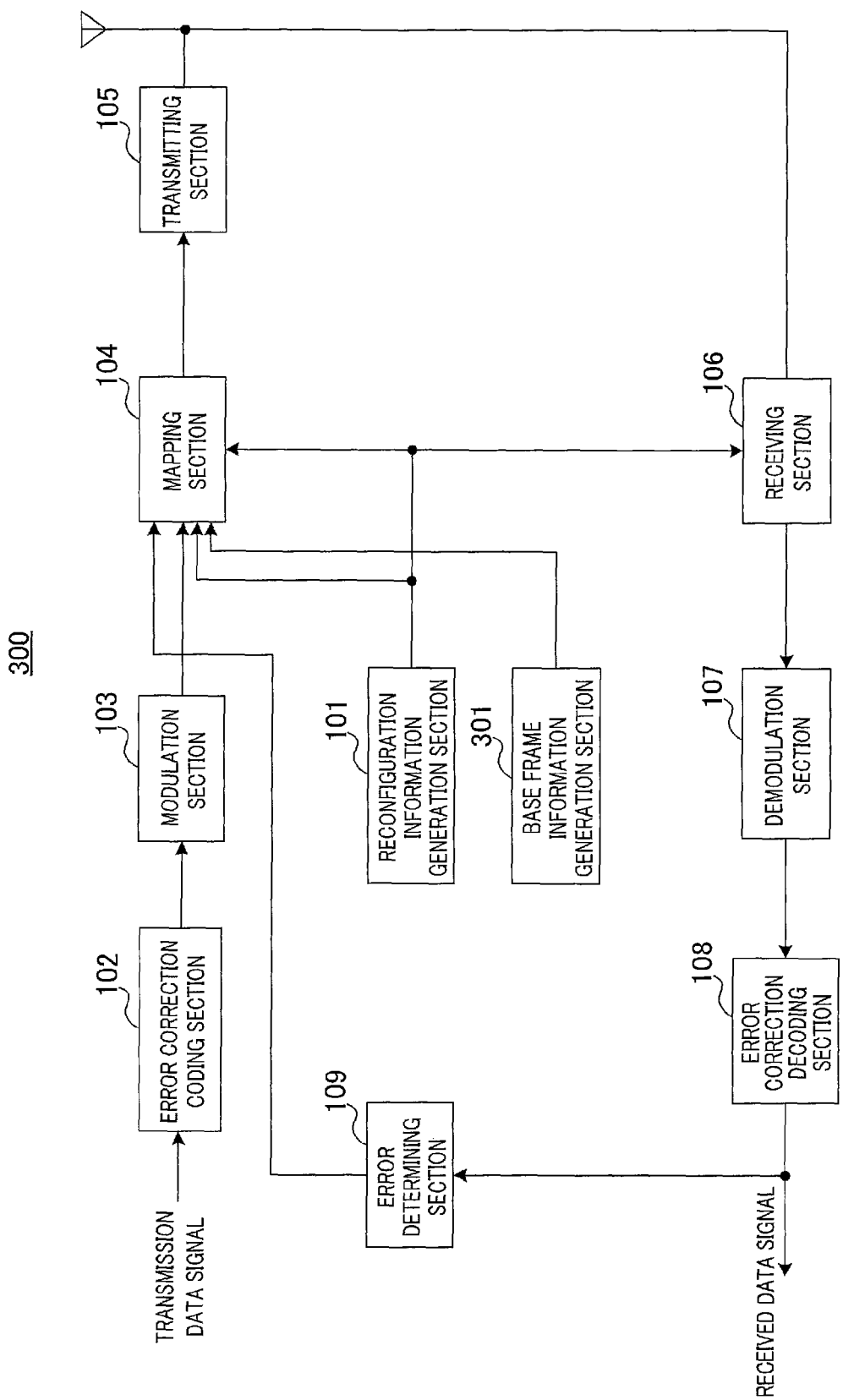
FIG. 8 is a block diagram illustrating a configuration of a base station according to Embodiment 2 of the present invention.

FIG. 8 is a block diagram illustrating a configuration of base station 300 according to another embodiment of the present invention.

In FIG. 8, base frame information generation section 301 generates base frame information indicating a frame which becomes a base frame and outputs the base frame information to mapping section 104.

When cycles (number of frames) of UL HARQ processes of UL-DL configurations before and after reconfiguration differ, the base frame information indicates one of a number of frames (patterns) corresponding to a least common multiple between cycles (number of frames) of UL HARQ processes. The above-described least common multiple corresponds to the number of patterns of frames differing in the association between subframe numbers and process numbers of UL HARQ processes. That is, base station 300 determines a pattern to be set as a base frame for terminal 400 (which will be described later) of the frame patterns corresponding to the least common multiple and generates base frame information corresponding to the determined pattern (base frame). The base frame information may also be used as information indicating a frame (reconfiguration frame) in which UL DL configurations are reconfigured. The base frame information and reconfiguration information may be combined into one signal.

In addition to the operation of Embodiment 1, mapping section 104 assigns the base frame information received from base frame information generation section 301 to a downlink resource and outputs the base frame information to transmitting section 105.

Figure 9:
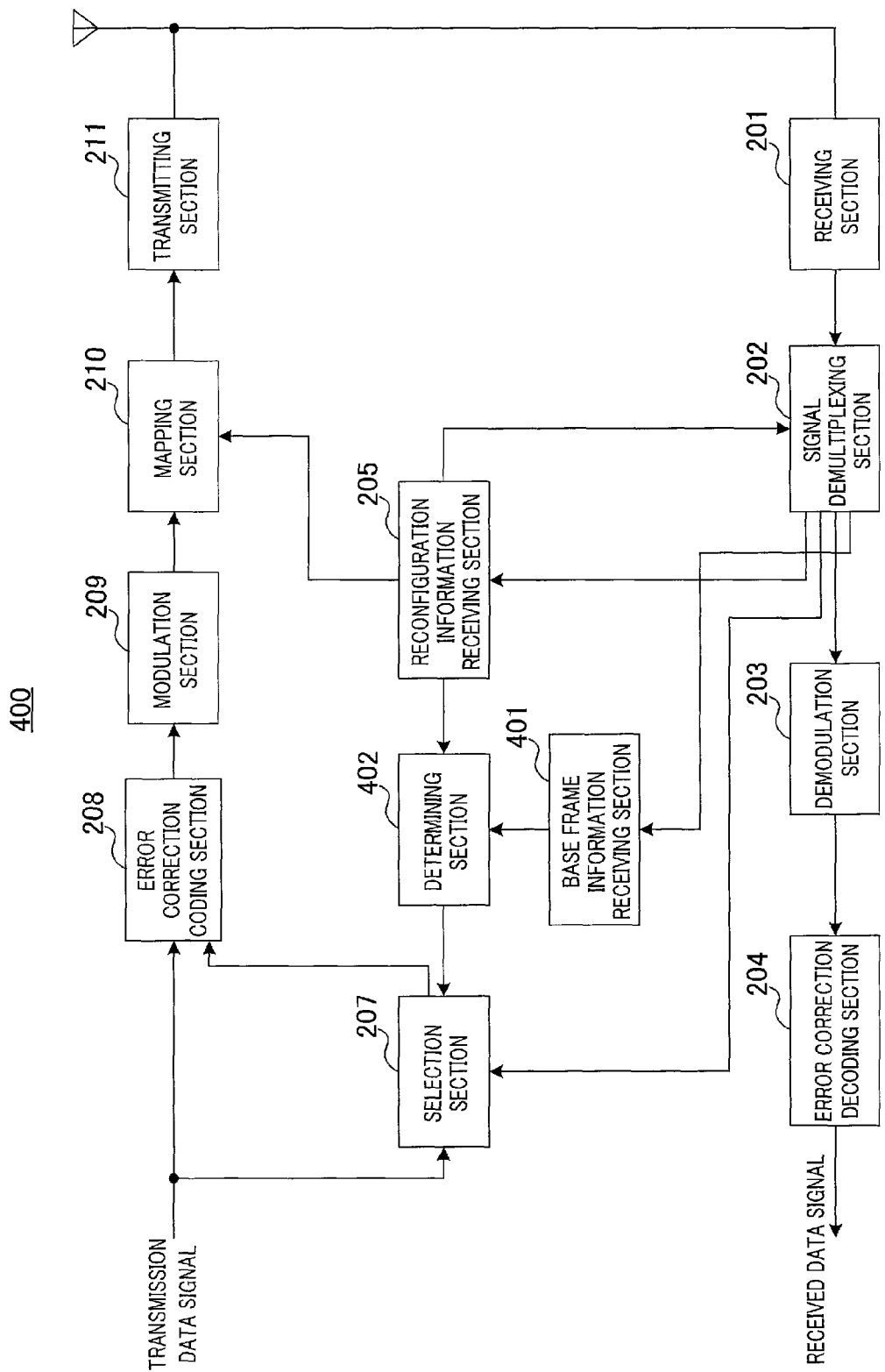
FIG. 9 is a block diagram illustrating a configuration of a terminal according to Embodiment 2 of the present invention.

FIG. 9 is a block diagram illustrating a configuration of terminal 400 according to the embodiment of the present invention.

In FIG. 9, base frame information receiving section 401 extracts base frame information intended for terminal 400 from control information received from signal demultiplexing section 202. Thus, terminal 400 receives the base frame information. Base frame information receiving section 401 outputs the extracted base frame information to determining section 402.

Determining section 402 determines UL HARQ processes to be continued in UL-DL configurations before and after reconfiguration based on reconfiguration information received from reconfiguration information receiving section 205 and the base frame information received from base frame information receiving section 401. Determining section 402 outputs the association of the determined UL HARQ processes to selection section 207.

[Operations of Base Station 300 and Terminal 400]

The operations of base station 300 and terminal 400 configured as described above will be described in detail.

Base station 300 indicates the UL-DL configuration reconfiguration information and the base frame information of terminal 400 to terminal 400 over a plurality of frames near a reconfiguration frame. Base station 300 can instruct reconfiguration between UL-DL configurations for terminal 400 in not only the base frame but also any frame.

As in the case of Embodiment 1, in the base frame, terminal 400 preferentially causes UL HARQ processes to be continued at timings at which both UL-DL configurations before and after the reconfiguration are UL subframes.

Terminal 400 does not perform the next retransmission for UL HARQ processes with no continuation destination of the UL-DL configuration before reconfiguration even in the middle of retransmission. Terminal 400 starts transmitting new data for UL HARQ processes with no continuation destination of the UL-DL configuration after reconfiguration.

Since a case where UL-DL configurations before and after the reconfiguration have an identical cycle is similar to that in Embodiment 1, description thereof will be omitted.

<UL-DL Configurations have Different Cycles (FIG. 10)>

A case where UL-DL configurations before and after reconfiguration have different cycles will be described.

A base frame is uniquely determined by the UL-DL configuration before reconfiguration and the UL-DL configuration after reconfiguration. More specifically, the number of frames corresponding to a least common multiple between cycles (number of frames) of UL HARQ processes of UL-DL configurations before and after reconfiguration is used as candidates (patterns) of a frame which can become a base frame.

In reconfiguration between Config#0 and Config#1, 2, 3, 4, 5, for example, since a least common multiple between cycles (number of frames) of UL HARQ processes is 7, the base frame is selected from among 7 patterns of frames #7N+0, #7N+1, #7N+2, #7N+3, #7N+4, #7N+5 and #7N+6. The number of bits necessary to indicate these 7 patterns is 3.

In reconfiguration between Config#6 and Config#1, 2, 3, 4, 5, since a least common multiple between cycles (number of frames) of UL HARQ processes is 6, the base frame is selected from among 6 patterns of frames #6N+0, #6N+1, #6N+2, #6N+3, #6N+4 and #6N+5. The number of bits necessary to indicate these 7 patterns is 3.

In reconfiguration between Config#0 and Config#6, since a least common multiple between cycles (number of frames) of UL HARQ processes is 42, the base frame is selected from among 42 patterns of frames #42N+0, #42N+1, . . . , #42N+41. The number of bits necessary to indicate these 42 patterns is 6. Note that in reconfiguration between Config#0 and Config#6, there are more patterns than patterns in other reconfiguration patterns. Thus, patterns selectable as the base frame may be limited to, for example, some of 42 patterns (e.g., 8 patterns: frames #42N+0, #42N+6, #42N+12, #42N+18, #42N+24, #42N+30, #42N+36 and #42N+41). By limiting the number of patterns, for example, to 8, the number of bits necessary to indicate patterns can be set to 3 also in reconfiguration between Config#0 and Config#6 as in the case of other reconfiguration.

Terminal 400 (determining section 402) sets the base frame based on the reconfiguration information and base frame information. Terminal 400 determines UL HARQ processes to be continued in UL-DL configurations before and after the reconfiguration based on the association between UL subframes and UL HARQ processes in the base frame as in the case of Embodiment 1.

An example of reconfiguration between Config#0 and Config#2 will be described.

Since the cycle of UL HARQ processes in Config#0 is 7 frames and the cycle of UL HARQ processes in Config#2 is 1 frame, the least common multiple these frames is 7. The base frame is selected from 7 patterns of frames #7N+0, #7N+1, #7N+2, #7N+3, #7N+4, #7N+5 and #7N+6. For example, in FIG. 10, base station 300 determines frame #7N+1 as the base frame. In that case, base station 300 indicates information indicating parameter (indication) '1' together with the reconfiguration information (reconfiguration) of the UL-DL configuration as base frame information to terminal 400. That is, in FIG. 10, base station 300 (base frame information generation section 301) generates parameter 'x' as base frame information with regard to frame #7N+x (x=0 to 6) of 7 patterns.

Figure 10:
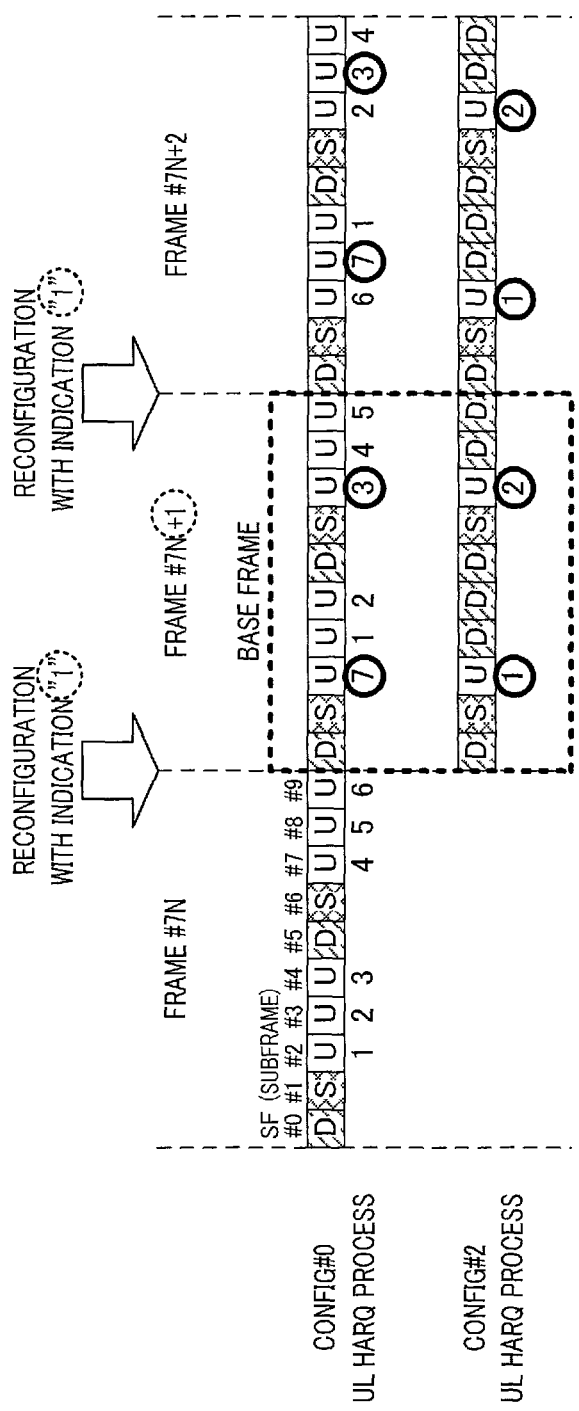
FIG. 10 is a diagram illustrating a UL-DL configuration reconfiguration method according to Embodiment 2 of the present invention.

As shown in FIG. 10, upon detecting reconfiguration information and base frame information, terminal 400 (determining section 402) determines frame #7N+1 as the base frame based on reconfiguration information and base frame information (parameter '1').

As in the case of Embodiment 1, terminal 400 determines a UL HARQ process in UL-DL configuration before reconfiguration as the continuation source UL HARQ process at timing at which both UL-DL configurations before and after the reconfiguration are UL subframes in the base frame and determines a UL HARQ process in UL-DL configuration after reconfiguration at the timing as the continuation destination UL HARQ process.

Here, timings at which both Config#0 and Config#2 become UL subframes are subframes #2 and #7. As shown in FIG. 10, in base frame #7N+1, subframe #2 in Config#0 corresponds to UL HARQ process #7 and subframe #7 corresponds to UL HARQ process #3. As shown in FIG. 10, in base frame #7N+1, subframe #2 in Config#2 corresponds to UL HARQ process #1 and subframe #7 corresponds to UL HARQ process #2.

Thus, terminal 400 associates UL HARQ process #7 in Config#0 with UL HARQ process #1 in Config#2 and associates UL HARQ process #3 in Config#0 with UL HARQ process #2 in Config#2. Upon detecting reconfiguration information and base frame information in any frame without being limited to base frame #7N+1, terminal 400 causes UL HARQ processes to be continued according to the association between UL HARQ processes in the base frame.

For example, as shown in FIG. 10, even when detecting the reconfiguration information (reconfiguration) and base frame information (indication) in frame #7N+2, terminal 400 causes UL HARQ process #7 in Config#0 to be continued as UL HARQ process #1 in Config#2 and causes UL HARQ process #3 in Config#0 to be continued as UL HARQ process #2 in Config#2. Note that in FIG. 10, terminal 400 does not perform the next retransmission for UL HARQ processes #1, #2, #4, #5 in Config#0 before reconfiguration even in the middle of retransmission.

The same applies to a case where Config#2 is reconfigured to Config#0 (not shown).

In this way, in the present embodiment, base frame information is indicated from base station 300 to terminal 400, and it is thereby possible to flexibly set UL HARQ processes to be continued in UL-DL configurations before and after the reconfiguration.

In FIG. 10, even when UL-DL configuration reconfiguration timing in terminal 400 recognized by base station 300 is different from actual UL-DL configuration reconfiguration timing in terminal 400, base station 300 and terminal 400 have the same recognition of UL HARQ processes to be continued in UL-DL configurations before and after the reconfiguration. That is, if terminal 400 can receive at least one of reconfiguration information and base frame information indicated a plurality of times, base station 300 and terminal 400 can have the same recognition of UL HARQ processes to be continued in UL-DL configurations before and after the reconfiguration as in the case of Embodiment 1. Thus, as in the case of Embodiment 1, even when UL-DL configurations are reconfigured, base station 300 and terminal 400 can have the same recognition of UL HARQ processes to be continued in UL-DL configurations before and after the reconfiguration and it is thereby possible to avoid terminal 400 from retransmitting wrong data.

Note that the above-described embodiment may define that UL HARQ processes will not be continued at the time of reconfiguration between Config#0 and Config#6. At the time of reconfiguration between Config#0 and Config#6, there are more patterns (42 patterns) of frames that can be adopted as base frames than patterns at the time of reconfiguration between other UL-DL configurations and more bits are used to indicate a base frame. Thus, by not supporting continuation of UL HARQ processes at the time of reconfiguration between Config#0 and Config#6, it is possible to reduce the number of bits necessary to indicate the base frame. Note that in Config#0 and Config#6, there is no significant difference in the ratio between DL subframes and UL subframes, reconfiguration between these two UL-DL configurations is estimated not to occur frequently. Therefore, even when continuation of UL HARQ processes at the time of reconfiguration between the two UL-DL configurations is not supported, the influence on the system of the UL HARQ processes being not continued is small.

<Variations of Embodiment 2>

Here, the base frame information indicates a relative positional relationship (relative value) between a frame in which the base frame information is indicated (that is, a frame in which terminal 400 receives the base frame information) and the base frame.

For example, base station 300 indicates parameter '−p' as base frame information in a frame p frames earlier than the base frame, indicates parameter '0' as base frame information in the base frame and indicates parameter 'q' as base frame information in a frame q frames later than the base frame. In contrast, terminal 400 identifies the base frame based on the frame in which the base frame information was received and a parameter (−p, 0 or q) indicated in the base frame information.

Figure 11:
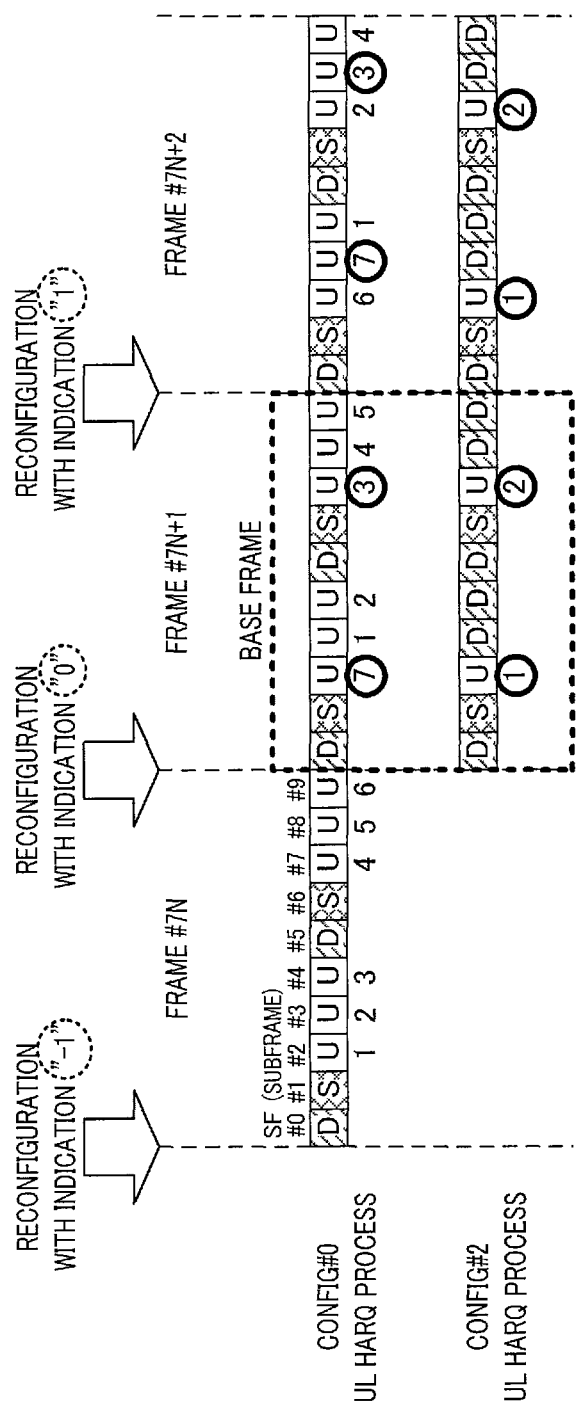
FIG. 11 is a diagram illustrating a UL-DL configuration reconfiguration method according to a variation of Embodiment 2 of the present invention.

For example, FIG. 11 illustrates a case where the base frame is set in frame #7N+1. As shown in FIG. 11, base station 300 indicates parameter (indication) '−1' in frame #7N one frame earlier than base frame (frame #7N+1), indicates parameter '0' in the base frame (frame #7N+1), and indicates parameter '1' in frame #7N+2 1 frame later than the base frame (frame #7N+1). In contrast, upon receiving base frame information ('−1') in frame #7N, terminal 400 identifies that frame #7N+1 1 frame later than frame #7N is the base frame. Similarly, upon receiving base frame information ('0') in frame #7N, terminal 400 identifies that frame #7N is the base frame. Similarly, upon receiving base frame information ('1') in frame #7N+2, terminal 400 identifies that frame #7N+1 1 frame earlier than frame #7N+2 is the base frame.

By so doing, it is possible to flexibly set UL HARQ processes to be continued in UL-DL configurations before and after the reconfiguration as in the case of Embodiment 2 (FIG. 10).

The above-described base frame information (−p, . . . , −1, 0, 1 . . . , q) is indicated using a predetermined number of bits. For example, when the base frame information is expressed by 3 bits, the base frame information can be indicated in 8 frames including the base frame. Thus, for example, even when there are 42 patterns as in the case of reconfiguration between Config#0 and Config#6, it is possible to indicate the base frame using only 3-bit information without limiting patterns selectable as the base frame. That is, whatever the combination of UL-DL configurations before and after the reconfiguration (that is, the number of frame patterns that can be adopted as the base frame), it is possible to indicate the base frame using the same number of bits (that is, the same format).

The base frame information may also be used as reconfiguration information (that is, information indicating a reconfiguration frame). In that case, when the ratio of parameters indicating frames earlier than the reconfiguration frame of the number of frames (8 frames in the case of 3 bits) that can indicate the base frame information (reconfiguration information) is increased (|p|>|q|), the possibility that terminal 400 can recognize reconfiguration between UL-DL configurations in advance increases. This reduces the possibility that terminal 400 may operate according to the UL-DL configuration before reconfiguration regardless of the fact that UL-DL configurations have been reconfigured and allows a robust operation. On the other hand, when the ratio of parameters indicating a frame later than the reconfiguration frame of the number of frames that can indicate base frame information (reconfiguration information) is increased (|p|<|q|), base station 300 need not set reconfiguration between UL-DL configurations in advance and more dynamic reconfiguration between UL-DL configurations is possible.

The embodiments of the present invention have been described so far.

[Other Embodiments]

Continuation of UL HARQ processes in the above embodiments may be applied to only a case where assignment of uplink data is continued. For example, when there is no allocation of uplink data for a certain period of time, the base station and terminal may transmit/receive new data without continuing UL HARQ processes in UL-DL configurations before and after the reconfiguration.

Each of the embodiments has been described with antennas, but the present invention can be applied to antenna ports in the same manner.

The term "antenna port" refers to a logical antenna including one or more physical antennas. In other words, the term "antenna port" does not necessarily refer to a single physical antenna, and may sometimes refer to an array antenna formed of a plurality of antennas and/or the like.

For example, LTE does not specify the number of physical antennas forming an antenna port, but specifies an antenna port as a minimum unit allowing each base station to transmit a different reference signal.

In addition, an antenna port may be specified as a minimum unit for multiplication of precoding vector weighting.

In the foregoing embodiments, the present invention is configured with hardware by way of example, but the present invention can be also implemented by software in conjunction with hardware.

In addition, the functional blocks used in the descriptions of the embodiments are typically implemented as LSI devices, which are integrated circuits. These functional blocks may be formed as individual chips, or part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor, which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

As described above, a terminal apparatus according to the present disclosure is a terminal apparatus capable of reconfiguring a configuration pattern of subframes to one of a plurality of configuration patterns including a downlink subframe used for downlink communication and an uplink subframe used for uplink communication, the subframes forming one frame, the terminal apparatus including: a determining section that determines a first retransmission process to be continued after reconfiguration from among retransmission processes of a configuration pattern before the reconfiguration based on an association between the uplink subframe and a retransmission process in a base frame uniquely determined by the configuration patterns before and after the reconfiguration, and that determines a second retransmission process to which the first retransmission process is continued from among the retransmission processes of the configuration pattern after the reconfiguration, the association being set for each of the plurality of configuration patterns; and a selection section that selects data to be retransmitted from among transmission data stored for each retransmission process, based on the first retransmission process and the second retransmission process.

In the terminal apparatus according to this disclosure, the base frame is a frame assigned a frame number which is divisible by a least common multiple between a frame cycle indicating an interval in the configuration pattern before the reconfiguration at which the association between the uplink subframe and a retransmission process associated with the uplink subframe becomes identical and the frame cycle in the configuration pattern after the reconfiguration.

In the terminal apparatus according to this disclosure, the base frame is a frame assigned a frame number obtained by adding a predetermined number to a frame number which is divisible by a least common multiple between a frame cycle indicating an interval in the configuration pattern before the reconfiguration at which the association between the uplink subframe and a retransmission process associated with the uplink subframe becomes identical and the frame cycle in the configuration pattern after the reconfiguration.

In the terminal apparatus according to this disclosure, the determining section determines, as the first retransmission process, the retransmission process of the configuration pattern before the reconfiguration at a first timing at which both subframes are the uplink subframes in the base frame at an identical timing of the configuration patterns before and after the reconfiguration, and determines, as the second retransmission process, the retransmission process of the second configuration pattern at the first timing.

In the terminal apparatus according to this disclosure, the determining section further determines, as the first retransmission process, the retransmission process of the configuration pattern before the reconfiguration at a second timing different from the first timing in the base frame, and determines, as the second retransmission process, the retransmission process of the configuration pattern after the reconfiguration at a third timing different from the first timing and the second timing.

In the terminal apparatus according to this disclosure, the determining section determines, as the first retransmission process, the retransmission process of the configuration pattern before the reconfiguration at the earliest timing among a plurality of the second timings.

The terminal apparatus according to this disclosure further includes a receiving section that receives information indicating the base frame, in which the determining section determines the first retransmission process and the second retransmission process based on the base frame indicated in the information.

In the terminal apparatus according to this disclosure, the information indicates one of a number of frames corresponding to a least common multiple between a frame cycle indicating an interval in the configuration pattern before the reconfiguration at which the association between the uplink subframe and a retransmission process associated with the uplink subframe becomes identical and the frame cycle in the configuration pattern after the reconfiguration.

In the terminal apparatus according to this disclosure, the information indicates a relative positional relationship between the base frame and a frame in which the information is transmitted.

A retransmission method according to this disclosure is a retransmission method for a terminal apparatus capable of reconfiguring a configuration pattern of subframes to one of a plurality of configuration patterns including a downlink subframe used for downlink communication and an uplink subframe used for uplink communication, the subframes forming one frame, the retransmission method including: determining a first retransmission process to be continued after reconfiguration from among retransmission processes of a configuration pattern before the reconfiguration based on an association between the uplink subframe and a retransmission process in a base frame uniquely determined by the configuration patterns before and after the reconfiguration, and determining a second retransmission process to which the first retransmission process is continued from among the retransmission processes of the configuration pattern after the reconfiguration, the association being set for each of the plurality of configuration patterns; and selecting data to be retransmitted from among transmission data stored for each retransmission process, based on the first retransmission process and the second retransmission process.

The disclosure of Japanese Patent Application No. 2012-257527, filed on Nov. 26, 2012, including the specification, drawings, and abstract is incorporated herein by reference in its entirety.

INDUSTRIAL APPLICABILITY

The present invention is useful for a mobile communication system or the like.

REFERENCE SIGNS LIST 100, 300 Base station
200, 400 Terminal
101 Reconfiguration information generation section
102, 208 Error correction coding section
103, 209 Modulation section
104, 210 Mapping section
105, 211 Transmitting section
106, 201 Receiving section
107, 203 Demodulation section
108, 204 Error correction decoding section
109 Error determining section
202 Signal demultiplexing section
205 Reconfiguration information receiving section
206, 402 Determining section 207 Selection section
301 Base frame information generation section
401 Base frame information receiving section

The invention claimed is:

1. A terminal apparatus capable of reconfiguring a configuration pattern of subframes to one of a plurality of configuration patterns, each of the plurality of configuration patterns defining transmission timings of one or more downlink subframes used for downlink communication and one or more uplink subframes used for uplink communication within a frame, the terminal apparatus comprising:
   determining circuitry, which, in operation,
      determines at least one first retransmission process to be continued after reconfiguration of the configuration pattern from among retransmission processes that belong to an old configuration pattern before the reconfiguration, wherein the determination of the at least one first retransmission process is made based on an association relationship between uplink subframe numbers and respective retransmission process numbers within a base frame, the base frame being a frame that includes at least one uplink subframe defined at a same transmission timing as another uplink subframe defined by a new configuration pattern after the reconfiguration, wherein the base frame is assigned a frame number which is divisible by a least common multiple between a first frame cycle associated with the old configuration pattern and a second frame cycle associated with the new configuration pattern, and the association relationship between the uplink subframe numbers and the respective retransmission process numbers within the base frame is uniquely determined by a combination of the old configuration pattern before the reconfiguration and the new configuration pattern after the reconfiguration; and
      determines at least one second retransmission process to which the at least one first retransmission process is continued from among the retransmission processes that belong to the new configuration pattern after the reconfiguration, wherein the association relationship is set for each of the plurality of configuration patterns; and
   selection circuitry, which, in operation, selects data to be retransmitted from among transmission data stored for each retransmission process, based on the first retransmission process and the second retransmission process.

2. The terminal apparatus according to claim 1, wherein the first frame cycle indicates an interval in the old configuration pattern at which the association relationship between uplink subframe numbers and retransmission process numbers becomes identical and the second frame cycle indicates an interval in the new configuration pattern at which the association relationship between uplink subframe numbers and retransmission process numbers becomes identical.

3. The terminal apparatus according to claim 1, wherein the determining circuitry, in operation, determines, as the first retransmission process, the retransmission process of the old configuration pattern before the reconfiguration at a first timing at which both subframes are the uplink subframes in the base frame at an identical timing of the configuration patterns before and after the reconfiguration, and determines, as the second retransmission process, the retransmission process of the new configuration pattern at the first timing.

4. The terminal apparatus according to claim 3, wherein the determining circuitry, in operation, determines, as the first retransmission process, the retransmission process of the old configuration pattern before the reconfiguration at a second timing different from the first timing in the base frame, and determines, as the second retransmission process, the retransmission process of the new configuration pattern after the reconfiguration at a third timing different from the first timing and the second timing.

5. The terminal apparatus according to claim 4, wherein the determining circuitry, in operation, determines, as the first retransmission process, the retransmission process of the old configuration pattern before the reconfiguration at the earliest timing among a plurality of the second timings.

6. The terminal apparatus according to claim 1, comprising a receiver, which, in operation, receives information indicating the base frame, wherein the determining circuitry determines the first retransmission process and the second retransmission process based on the base frame indicated in the information.

7. The terminal apparatus according to claim 6, wherein the information indicates one of a number of frames corresponding to a least common multiple between a frame cycle indicating an interval in the old configuration pattern before the reconfiguration at which the association between the uplink subframe and a retransmission process associated with the uplink subframe becomes identical and the frame cycle in the new configuration pattern after the reconfiguration.

8. The terminal apparatus according to claim 6, wherein the information indicates a relative positional relationship between the base frame and a frame in which the information is transmitted.

9. A retransmission method for a terminal apparatus capable of reconfiguring a configuration pattern of subframes to one of a plurality of configuration patterns, each of the plurality of configuration patterns defining transmission timings of one or more downlink subframes used for downlink communication and one or more uplink subframes used for uplink communication within a frame, the retransmission method comprising:
   determining at least one first retransmission process to be continued after reconfiguration of the configuration pattern from among retransmission processes that belong to an old configuration pattern before the reconfiguration, wherein the determination of the at least one first retransmission process is made based on an association relationship between uplink subframe numbers and respective retransmission process numbers within a base frame, the base frame being a frame that includes at least one uplink subframe defined at a same transmission timing as another uplink subframe defined by a new configuration pattern after the reconfiguration, wherein the base frame is assigned a frame number which is divisible by a least common multiple between a first frame cycle associated with the old configuration pattern and a second frame cycle associated with the new configuration pattern, and the association relationship between the uplink subframe numbers and the respective retransmission process numbers within the base frame is uniquely determined by a combination of the old configuration pattern before the reconfiguration and the new configuration pattern after the reconfiguration;
   determining at least one second retransmission process to which the at least one first retransmission process is continued from among the retransmission processes that belong to the new configuration pattern after the reconfiguration, wherein the association relationship is set for each of the plurality of configuration patterns; and selecting data to be retransmitted from among transmission data stored for each retransmission process, based on the first retransmission process and the second retransmission process.

10. The method according to claim 9 wherein the first frame cycle indicates an interval in the old configuration pattern at which the association relationship between uplink subframe numbers and retransmission process numbers becomes identical and the second frame cycle indicates an interval in the new configuration pattern at which the association relationship between uplink subframe numbers and retransmission process numbers becomes identical.

* * * * *